United States Patent Office 2,777,883
Patented Jan. 15, 1957

2,777,883
ISOBUTYLENE ALLYLIC MONOCHLORIDE

Robert R. Chambers and Robert L. Foster, Park Forest, Ill., assignors to Sinclair Refining Company, New York, N. Y., a corporation of Maine No Drawing. Application February 25, 1954,
Serial No. 412,632

3 Claims. (Cl. 260—654)

This invention relates to the allylic unsaturated monochlorides of triisobutylene and tetraisobutylene as new compositions of matter.

It is well-known that alkyl chlorides provide versatile chemical intermediates since the chloride group can be replaced with numerous other functional groups such as —OH, —NH₂, —SH, —SCN, —NO₂, etc. It is often desirable to provide these functional groups with a hydrocarbon skeleton of intermediate molecular weight in the range say, of 12 to 16 carbon atoms. An alkyl radical of this size will usually confer a large degree of solubility in organic solvents which is highly desirable when a compound containing a relatively polar functional group is introduced into a hydrocarbon solvent such as distillate fuels, paint solvents, lubricating oils, etc. In addition, an alkyl radical of this size will often place the molecule in an intermediate molecular weight range which is desirable for instance in some insecticides, vapor phase rust inhibitors, and the like, where a definite but slow rate of volatilization is desired. Putting these desires together it is natural to expect that there should be considerable commercial use of intermediate molecular weight alkyl chlorides in making various useful chemical compositions. However, this is not the case in spite of the fact that a number of such chlorides have been available commercially, e. g. monochlorinated paraffin wax, 2-ethylhexyl chloride, etc.

The reasons such compounds have not found appreciable commercial use as intermediates appears to be due to their lack of reactivity. Apparently as the molecular weight of an alkyl chloride is increased it tends to lose much of the typical reactivity of the lower molecular weight members. Furthermore, when reaction conditions are made more severe to compensate for this unreactivity, these intermediate molecular weight alkyl chlorides tend to dehydrochlorinate forming olefins to the exclusion of the desired reaction.

In the present invention we provide new intermediate molecular weight chlorides of high reactivity suitable for use as intermediates in many of the usual chemical reactions of lower molecular weight alkyl chlorides. Also, we provide new chlorides of intermediate molecular weight which have little or no tendency to undergo dehydrochlorination under the conditions required by many substitution reactions. The compounds of the present invention are further desirable since they are reactive chlorides of intermediate molecular weight which may be produced very simply and economically from readily available petroleum hydrocarbons.

Our invention then comprises as new compositions of matter the allylic monochlorides of triisobutylene and tetraisobutylene. Both the triisobutylene and tetraisobutylene are readily prepared by well-known methods involving the polymerization of isobutylene with Friedel-Crafts type catalysts such as sulfuric acid or boron trifluoride. Pure isobutylene need not be used as a feed but the usual C₃ and C₄ paraffin-olefin streams found at several points in the refinery and containing even minor portions, say about 10 to 20% of isobutylene, can be used. Thus the hydrocarbon polymers of triisobutylene and tetraisobutylene can be obtained at very low cost and in fact they are sometimes produced as by-products in refinery practice.

These polymers are mixtures of isomers and their complete composition is unknown. However, the literature does indicate that certain structures probably predominate. Triisobutylene and tetraisobutylene are unusual in their molecular weight class because of the relatively few isomers which are present in the separate compound. Triisobutylene includes isomers of the following structures:

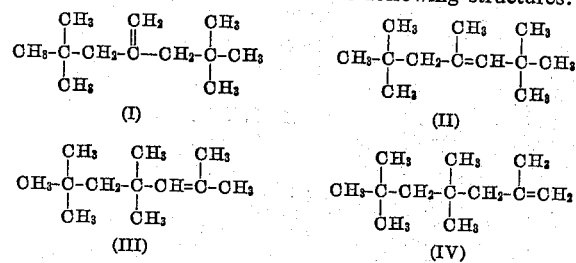

The isomers of Formulas I and II compose about 90 percent of triisobutylene.

Tetraisobutylene includes largely three isomers whose formulas are:

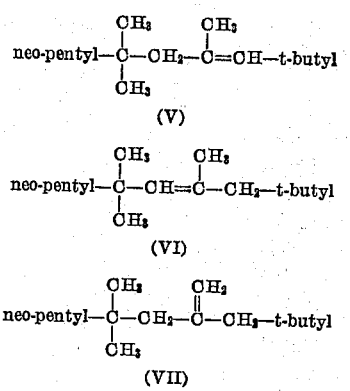

The isomers of Formulas V and VI compose about 60 percent of the tetraisobutylene.

We have found that triisobutylene may be chlorinated to yield allylic monochlorides. Other possible products from the chlorination of triisobutylene are the saturated tertiary chloride 2,2,4,6,6-pentamethyl - 4 - chloroheptane and vinyl type chlorides. The tertiary chloride is unstable at room temperature and would therefore not be expected to be present in the products separated from the reaction mixture by distillation. Tertiary chlorides of other structures are probably present only in minor amounts since upon hydrolysis of the chlorinated product only small amounts of olefin and a trace of tertiary alcohol were formed. Vinyl type chlorides are extremely resistant to hydrolysis so they could be present only in small amounts in view of the ready hydrolysis of the product.

We have also found that tetraisobutylene may be chlorinated to yield allylic monochlorides. During the chlorination of the tetraisobutylene a small amount of a saturated tertiary chloride is probably formed. This chloride is more stable than the corresponding chloride from triisobutylene and the former accounts for the formation of olefin and small amounts of tertiary alcohol during the hydrolysis. Vinyl type chlorides are not present in the reaction products, except possibly in small amounts, since the hydrolysis rate is greater than expected for the unreactive vinyl chlorides.

The chlorinations of triisobutylene and tetraisobutylene were effected in the liquid phase by gaseous chlorine being bubbled through the liquid olefin. The chlorinations were conducted according to the following specific procedures.

EXAMPLE I

Triisobutylene allylic monochloride 500 grams of liquid triisobutylene were placed in the reaction vessel. Gaseous chlorine was bubbled through the liquid at the rate of 0.25 moles per hour while the liquid was being stirred. The reaction continued for 5½ hours with the reacting mixture being maintained at a temperature from about 175° to 188° C. by application of heat. The feed was 42% converted based on the triisobutylene feed, and the yield of the allylic monochloride was 98% based on the total chlorinated product. The monochloride was separated from the unreacted feed and higher chlorinated material by distillation. The separated allylic monochloride had the following properties:

Boiling point _____ 213–217° C.
$n_D^{20}$ _____ 1.4549.
Specific gravity $20/4$ _____ 0.8875.
Molecular refractivity _____ 62.11 (theoretical 62.02).
Formula analysis—$C_{12}H_{23}Cl$:

|   | Calculated | Found |
|---|---|---|
| C | 71.08 | 71.33 |
| H | 11.43 | 11.39 |
| Cl | 17.49 | 17.1 |

Infrared analysis of the chloride showed unsaturation of both internal and terminal types.

EXAMPLE II

Triisobutylene allylic monochloride

The procedure was the same as that of Example I except that 2500 grams of feed were used and the chlorine was supplied at the rate of 1.94 moles per hour. The reaction continued for 6 hours with the temperature of the reaction mixture being held between 89° to 105° C. by the heat of reaction. The feed was 69% converted and the product contained 92% of the allylic monochloride based on the total chlorinated product.

EXAMPLE III

Tetraisobutylene allylic monochloride 439.5 grams of liquid tetraisobutylene, b. p. 232°–237° C., were placed in the reaction vessel. Gaseous chlorine was bubbled through the liquid at the rate of 0.71 moles per hour while it was being stirred. The reaction continued for 2 hours with the reacting mixture being held at a temperature from 98° to 107° C. The tetraisobutylene feed was 67% converted with the yield of allylic monochloride being 97% based on the total chlorinated product. The allylic monochloride was separated from unreacted tetraisobutylene by distillation and the monochloride had the following properties:

Boiling point _____ 125–135° C. at 10 mm. Hg.
$n_D^{20}$ _____ 1.4675.
Specific gravity $20/4$ _____ 0.8953.
Molecular refractivity _____ 80.65 (theroetical 80.49).
Formula analysis—$C_{16}H_{31}Cl$:

|   | Calculated | Found |
|---|---|---|
| C | 74.23 | 74.27 |
| H | 12.07 | 12.00 |
| Cl | 13.71 | 13.7 |

Infrared analysis showed unsaturation of both internal and terminal types.

All percentages mentioned above were calculated on a weight basis except yields which were calculated on a molar basis.

We claim:

1. A composition of matter selected from the group consisting of triisobutylene allylic monochloride and tetraisobutylene allylic monochloride.
2. Triisobutylene allylic monochloride.
3. Tetraisobutylene allylic monochloride.

References Cited in the file of this patent

UNITED STATES PATENTS

| 2,042,223 | Groll et al. | May 26, 1936 |
| 2,130,084 | Groll et al. | Sept. 13, 1938 |
| 2,485,265 | Eby | Oct. 18, 1949 |

OTHER REFERENCES

Annalen der Chemie, vol. 475 (1929), page 193.